United States Patent
Bonneville et al.

(10) Patent No.: US 12,212,503 B2
(45) Date of Patent: Jan. 28, 2025

(54) METHOD FOR SCHEDULING TSN FLOWS, COMMUNICATION SYSTEM, AND CENTRAL NETWORK CONFIGURATION ENTITY

(71) Applicant: Mitsubishi Electric Corporation, Tokyo (JP)

(72) Inventors: Herve Bonneville, Rennes (FR); Nicolas Gresset, Rennes (FR); Artem Boryskin, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/278,729

(22) PCT Filed: Nov. 4, 2021

(86) PCT No.: PCT/JP2021/041439
§ 371 (c)(1),
(2) Date: Aug. 24, 2023

(87) PCT Pub. No.: WO2022/208975
PCT Pub. Date: Oct. 6, 2022

(65) Prior Publication Data
US 2024/0205166 A1    Jun. 20, 2024

(30) Foreign Application Priority Data
Apr. 1, 2021   (EP) .................................. 21305420

(51) Int. Cl.
G06F 15/173    (2006.01)
H04L 47/283    (2022.01)
H04L 47/70     (2022.01)

(52) U.S. Cl.
CPC .......... *H04L 47/826* (2013.01); *H04L 47/283* (2013.01)

(58) Field of Classification Search
CPC ..................................................... H04L 47/826
See application file for complete search history.

(56) References Cited

U.S. PATENT DOCUMENTS

2020/0267673 A1    8/2020   Joseph et al.

FOREIGN PATENT DOCUMENTS

| WO | WO 2020/036911 A1 | 2/2020 |
| WO | WO 2020/239231 A1 | 12/2020 |

OTHER PUBLICATIONS

Japanese Office Action for Japanese Application No. 2023-561943, dated Jul. 2, 2024, with an English translation.

*Primary Examiner* — Joseph R Maniwang
(74) *Attorney, Agent, or Firm* — Birch, Stewart, Kolasch & Birch, LLP (57) ABSTRACT

The disclosure relates to a method for scheduling TSN flows in a communication system within a time-sensitive network. The method is implemented at a central network configuration entity.
Assistance information relating to a time granularity of transmission opportunities within a radio frame is obtained from at least one TSN bridge.
Based on the obtained assistance information, a plurality of TSN flows is scheduled by computing time sequences of said TSN flows down to said time granularity.
The disclosure further relates to a corresponding communication system and a corresponding central network configuration entity.

12 Claims, 6 Drawing Sheets

METHOD FOR SCHEDULING TSN FLOWS, COMMUNICATION SYSTEM, AND CENTRAL NETWORK CONFIGURATION ENTITY

TECHNICAL FIELD

The disclosure belongs to the field of telecommunications. It generally relates to a method and system for Time Sensitive Networking (TSN) and, more specifically, to a TSN network comprising a wireless bridge, such as 5G system (5GS).

In particular, there are disclosed a method for scheduling TSN flows, a communication system in which such method is implemented, a central network configuration entity as an entity, in such communication system, being configured to implement such method, a computer program for implementing such method at the central network configuration entity, and a computer-readable storage medium storing such computer program.

BACKGROUND ART

Fast and reliable communication & information networking and, in particular, the time sensitive networking (TSN) is essential for a smart factory environment. It allows integration across the factory by closely connecting the individual production steps as well as production planning and logistics.

To provide the sought connectivity, the industrial networks need to support various types of traffic, including time sensitive (TS) traffic used for real-time control over the machines and services that require deterministic performance.

Time sensitive networking (TSN) is standardized by IEEE 802.1Q to provide industrial networks with deterministic delay to handle TS traffic. The end-to-end communication deadlines and bounded jitter are guaranteed through a number of mechanisms such as time synchronization and TSN scheduling of individual frames and streams, e.g. in terms of per-stream and per-port gate control lists generated for all components within the network, as standardized by IEEE 802.1Qcc.

Initially, TSN networking was intended for wireline networks, capable of supporting the high-speed communication between sensors/controllers and IT centres. Moving from wired to wireless sensors and actuators provide additional advantages, such as mobility, scalability, and reduced maintenance cost. To connect the wireless devices to a TSN network, wireless transmission technologies such as the ones defined in 3GPP are necessary.

The integration between the wired and wireless technologies raises a number of challenges that are not fully resolved yet, such as the standards compatibility as well as the peculiarities of data transmission through the (bounded) wired and (open) wireless media.

As an Ethernet network, the TSN network is formed of end nodes (talker/listener nodes) and bridge nodes connecting between the end nodes through bi-directional Ethernet links.

In the centralized architecture, the end stations are transmitting the flow requirements and the TSN communication configuration to a centralized user configuration entity (CUC).

The CUC transmits the user configuration to a centralized network configuration entity (CNC).

Each TSN switch identifies to the CNC as a Delay managed object. The parameters that are transmitted to the TSN by the switch are egress and ingress port identification, traffic class and QoS indicators as minimum and maximum delays per port pairs.

The CNC calculates a schedule, i.e. transmission time, for the intermediary switches between the TSN end stations, and the control parameters of the TAS of the different switches as well as the routing decisions, i.e. switch selection. These calculations are performed to fulfil the stream requirements of the TSN communications.

Figure 1:
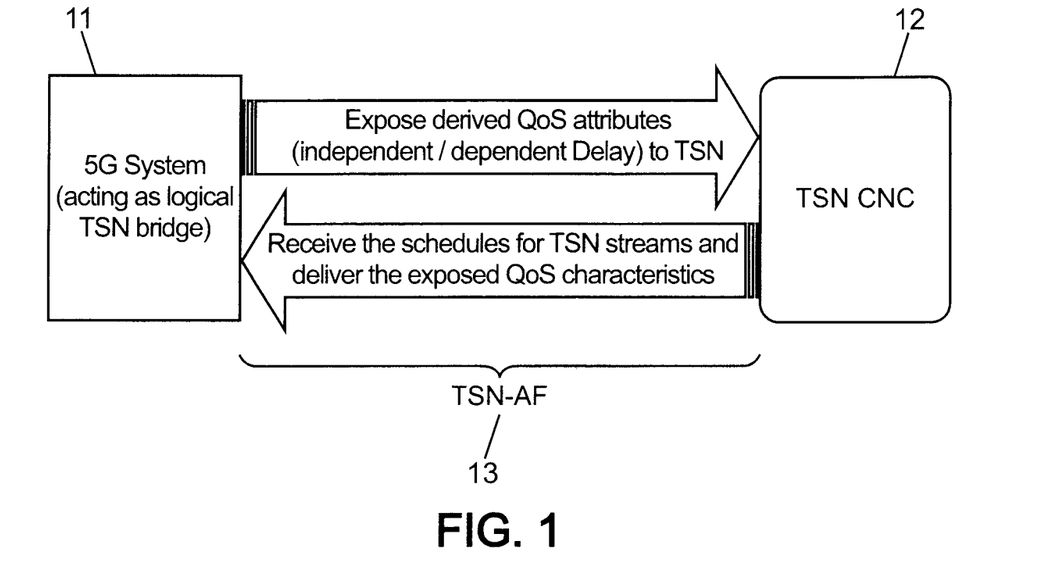
FIG. 1 illustrates a 5G system acting as logical TSN bridge, according to the 3GPP TS 23.501 standard, as known from prior art.
Figure 2:
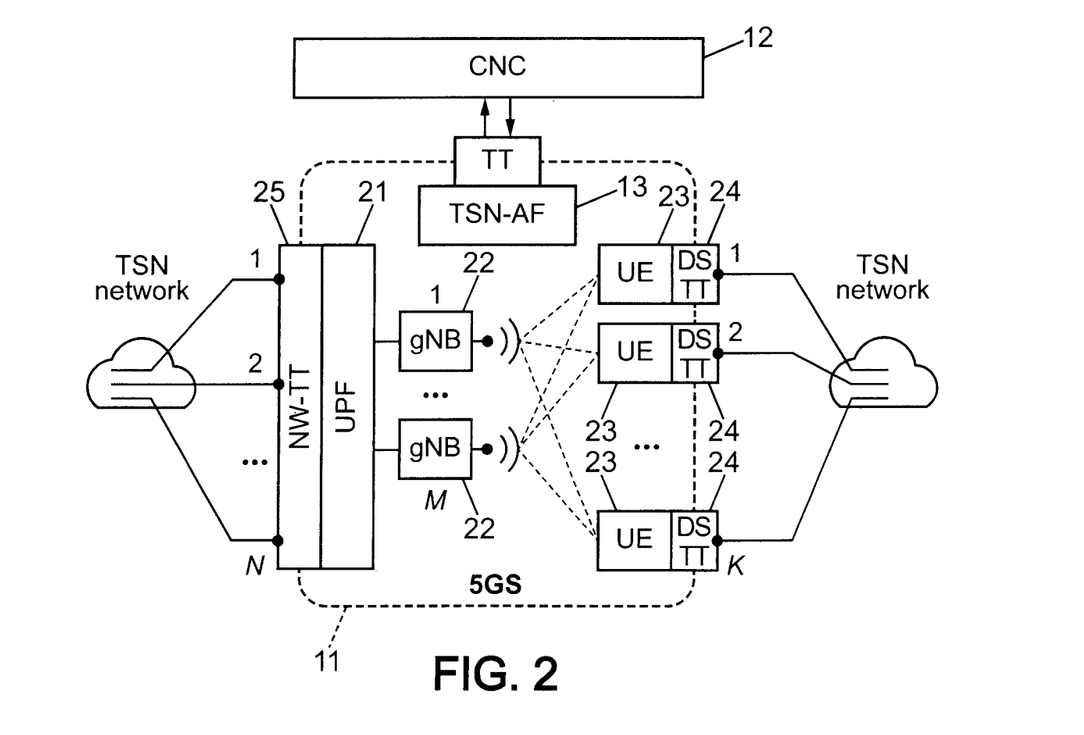
FIG. 2 depicts a generic model of a 5GS bridge as known from prior art.

FIG. 1 depicts interactions between the 5G system and the CNC according to the 3GPP TS 23.501 standard and FIG. 2 depicts a generic model of the 5G system acting as a wireless bridge.

Generally speaking, a wireless bridge is an entity of the TSN network which function is to connect together, through wireless means, an upstream subnetwork with a downstream subnetwork. In FIG. 1, the 5G system (11) is there considered as such a TSN bridge, that receives timing and control information from the central network configuration entity (CNC) (12) through a TSN application function (AF) (13). TSN-AF translates the control information from the CNC to policy control that defines the profile for the packet data unit (PDU) session. This profile is having the objective to propagate the TSN packets in the network, viewed as a logical TSN bridge to the TSN end stations, according to the CNC timing schedule.

The 5G system (11) comprises:
- a User Plane Function (UPF) (21) representing a component of a 3GPP 5G core infrastructure system architecture,
- at least one base station (gNB) (22), and
- at least one user equipment (UE) (23).

The at least one UE is wirelessly connected to said at least one gNB and is provided with at least one device side (DS) port (24). FIG. 2 represents K such DS ports, where K is any positive integer. The UPF has a wireline connection to said at least one gNB and is typically provided with at least one network side (NW) port (25). FIG. 2 represents N such NW ports, where N is any positive integer.

The 5GS bridge also comprises a TSN application function (AF) (13) which allows communicating with a Centralized Network Configuration (CNC) entity (12). The CNC (12) discovers physical topology and TSN capabilities of the network infrastructure (e.g. links and bridges), computes TSN scheduling, and configures TSN features of said bridges according to the TSN scheduling, thus, enabling a desired connectivity for the at least two ESs according to stream requests. In this regard, the CNC communicates with the bridges in the network, including, as depicted in FIG. 1, with the 5GS bridge represented in FIG. 2. Specifically, the 5GS bridge receives timing and control information from the central network configuration entity (CNC) (12) through a TSN application function (AF) (13). TSN-AF translates the control information from the CNC to policy control that defines the profile for the packet data unit (PDU) session. This profile is having the objective to propagate the TSN packets in the network, viewed as a logical TSN bridge to the TSN end stations, according to the CNC timing schedule.

Finally, each port may be provided with a TSN translator (TT), which purpose is to hide the internal features of the 5GS Bridge from the CNC and from other network entities.

Said TSN network may further comprise at least one wired TSN bridge having a fixed configuration in the sense that its TSN capabilities may be characterized by a single set of TSN parameters, e.g. min/max dependent and independent delays per port or per port pair, according to IEEE 802.1Qcc standard.

Unlike wired bridges, the 5GS bridge is characterized in having variable TSN capabilities that may be adjusted on request by tuning internal features of the 5GS bridge related to wireless communication. In particular, this may concern the independent delay, the dependent delay per a port pair related to the throughput capacity of a corresponding wireless link, or both. The dependent delay per a port pair may also be related with the amount of resource which is periodically reserved for transmission and the wireless link quality associated to said transmission. The competition for the radio resource used between UEs results in the interdependent properties of the wireless links: the more resource provided to a given link, the less resources remain for the others. Such agility in the 5GS bridge throughput capacity per UE potentially allows to adjust the 5GS bridge performance according to the traffic load and, in such a way, to optimize its performance.

In wireless communication, transmissions are slotted: The radio medium is split in the time dimension into elements called frames. A frame is itself composed of slots. The slots are allocated to incoming data by a function called the scheduler, depending on various factors as QoS requirements (delay, bandwidth, packet error rate typically), packet waiting time, desired fairness. The beginning of any transmission shall start at the beginning of a slot. Hence, whatever the scheduler's decision, transmission opportunities (TxOps) are discrete and incoming packets have to wait at least for the next TxOp before accessing the radio medium.

Hence, TxOps introduce a jitter, which is usually included in the transmission delay the system can afford. For time-sensitive traffic (TSC), this jitter can be absorbed with the implementation of a leaky bucket at the output, but at the cost of a delay corresponding to the maximum jitter.

In TSN system, the CNC schedules the different flows in all the network devices with the aim to have deterministic end-to-end transmission times. For this purpose, the CNC needs to have precise information about delays introduced by the network devices along the data path. In case the network device is a 5GS bridge, the TxOp granularity is included in the maximum delay advertised by the 5GS bridge. This is a conservative approach leading to not exploiting the 5GS bridge actual capability.

There are two classical ways to multiplex the two directions in a radio transmission. One is to separate them in frequency (Frequency Division Duplex, FDD), with one spectrum chunk dedicated to one direction (say the uplink, UL) and another spectrum chunk dedicated to the other direction, the downlink (DL). In FDD mode, UL and DL transmissions can happen simultaneously in time. Another possibility is to separate the two directions in time (Time Division Duplex, TDD). In TDD mode, slots in a frame are allocated either to UL or to DL. Hence, UL and DL can't happen at the same time, and this introduces additional constraints to TxOps, to be taken into account when computing the transmission delays of a 5GS bridge.

In 5G systems, there is the possibility for a scheduler to pre-empt at the last time a slot already allocated to a data flow to transmit a data element which is considered as urgent and has just arrived, minimising its transmission delay, at the cost of a retransmission of the data flow that has been pre-empted. However, this mechanism is not well adapted for TSN scenario, for several reasons. This mechanism can work well in DL, but is much less efficient in the UL, since the scheduler at the base station has first to be aware of the arrival of a data element at UE side. Then, TSN flows are typically periodic, and using pre-emption often and on a regular basis would lead to poor performances of the remaining traffic. If most of the traffic is TSC, then there would be little resources remaining to pre-empt. Another reason is that an important metric in TSN environment is to have deterministic (stable in time), bounded and controlled transmission delays. It seems then better in TSN context to have an allocation policy at the radio scheduler which is predictable.

5G TDD mode brings flexibility in terms of UL/DL split, offering the possibility to dynamically adapt the radio resources in UL and DL depending on the traffic direction. However this comes at the cost of interference generated. Indeed, it is generally recommended, and some spectrum regulations impose, that base stations operating in a given frequency band are synchronised in time altogether, and that they use a common UL/DL pattern. Regarding TSN, and assuming that there is flexibility in a 5GS bridge to select a given UL/DL pattern, a question is how to choose it to optimise performance regarding a given traffic, considering that the selection of an UL/DL pattern has an influence on 5GS bridge delay performance.

SUMMARY OF INVENTION

The invention is defined by the appended independent claims. Additional features and advantages of the concepts herein disclosed are set forth in the description which follows.

The present disclosure aims at improving the situation.

To this end, the present disclosure describes a method for scheduling TSN flows in a communication system within a time-sensitive network, the method being implemented at a central network configuration entity and comprising:

obtaining, from at least one TSN bridge having internal time constraints, assistance information relating to a time granularity of transmission opportunities within a transmission frame, and based on the obtained assistance information, scheduling a plurality of TSN flows by computing time sequences of said TSN flows down to said time granularity.

According to said method, said TSN bridge provides assistance information to the central network configuration entity (hereafter CNC) about the time granularity of its transmission opportunities. The CNC takes this information into account when computing the time sequences of the different TSN flows.

For instance, the assistance information may allow the CNC to appreciate, for a potential set of time sequences, what the resulting transmission delay of said TSN bridge would be. As a result, the CNC may be configured to optimize the transmission delay of said TSN bridge by scheduling TSN flows according to time sequences specifically determined so as to best use, as a whole, the available transmission opportunities.

In an example, the assistance information from a TSN bridge comprises a period and an offset, said offset being defined with respect to a clock common to the central network configuration entity and to said TSN bridge.

The combination of such period and offset allows the CNC to accurately know the time span of each slot in a frame. As a consequence, the CNC may schedule for example a packet arrival towards the end time of a slot and a transmission of said packet shortly after the beginning time of the next slot, in order for the transmission delay of said packet to be minimized.

In an example, the assistance information from a TSN bridge comprises a period and further comprises, for a plurality of oriented port pairs, a corresponding offset, said offsets being defined with respect to a clock common to the central network configuration entity and to said TSN bridge.

Providing a differentiated offset per oriented port pair allows the CNC to use different rules for scheduling the flows through a given port pair depending on the direction of the flow through said port pair. As a result, uplink and downlink communication may both be optimized, yet treated with different priorities.

In an example, the period corresponds to a slot duration and the offset indicates the beginning of a slot.

This allows the CNC to easily determine, from only a couple of values and by a simple modulo operation, the beginning time and the end time of each slot. As a result, the network resources for transmitting the assistance information and the computational resources at the CNC are jointly minimized.

In an example, the period corresponds to a slot duration, a first offset indicates the beginning of a first group of transmission opportunities statically allocated to a first direction of transmission and a second offset indicates the beginning of a second group of transmission opportunities statically allocated to a second direction of transmission.

In such example, for a frame structure where each slot comprises two portions each being statically allocated to a corresponding transmission of direction, the CNC may easily determine when to successfully and optimally schedule packet arrival times and, conversely, packet transmission times, based solely on concise assistance information, limited to a number of only three values.

In an example, the assistance information from a TSN bridge further comprises an indication of an allocation of each transmission opportunity, within a slot, for a first and a second directions of transmission.

In this example, the assistance information is robustly designed in that it allows the CNC to optimally schedule two-way transmissions, irrespective of the repartition of the natures of the transmission opportunities within one or more slots of a frame.

In an example, said indication comprises, for a plurality of oriented port pairs, a corresponding bitmap of an availability status of each transmission opportunity, within a slot.

A bitmap wherein each availability status is encoded on a single bit is a simple effective way of informing the CNC whether each transmission opportunity is available or not for a given oriented port pair.

As a result, the CNC may compute, for each oriented port pair, a time sequence where the flows are scheduled only at the available transmission opportunities for said oriented port pair. As a result, such computed time sequence may respect the frame structure in terms of whether uplink or downlink traffic is allowed for each transmission opportunity, even though said details related to the frame structure are not provided to the CNC. Therefore, the packets may be effectively received and transmitted, at a TSN bridge, at the optimal times according to the schedule. As a result, the delays through the TSN bridge are accurately managed.

In an example, said indication comprises:
- a plurality of bitmaps of an availability status of each transmission opportunity, within a slot, for a given direction of transmission, a bitmap corresponding to a predetermined possible slot structure, and
- for a plurality of oriented port pairs, a corresponding index to a specific bitmap of said plurality of bitmaps.

As a result, the overall quantity of assistance information to be transmitted by a TSN bridge to the CNC is minimized over the former example, especially in a scenario where a small number of different frame structures is shared by a plurality of oriented port pairs.

In an example, the assistance information from a TSN bridge further comprises:
- an indication of a corresponding nature of each transmission opportunity, each said nature being either flexible or fixed,
  - a flexible nature being associated to a flexible usage for a first and for a second directions of transmission,
  - a fixed nature being associated to a fixed usage for only one direction of transmission among the first and the second directions of transmission, and
- for a plurality of oriented port pairs, an indication of a corresponding direction of transmission among the first and second directions of transmission.

This allows optimizing transmission delays even accounting for specific frame structures where some transmission opportunities are flexible, i.e. neither forcibly dedicated, in a description of the frame structure at the TSN bridge, to uplink or to downlink transmission, but actually allocated at the last moment either to uplink or to downlink transmission by a base station.

The present disclosure also describes, in other aspects:
- the above communication system,
- a central network configuration entity for the above communication system,
- a computer-readable storage medium comprising instructions which, when executed by a processing unit, cause the processing unit to carry out the method hereby described,
- a computer program comprising one or more stored sequence/s of instructions that is accessible to a processing unit and which, when executed by the processing unit, causes the processing unit to carry out the method hereby described, and
- a processing circuit equipped with a processing unit operably connected to a memory, the processing circuit being configured to carry out the method hereby described.

DESCRIPTION OF EMBODIMENTS

The present disclosure describes a method for scheduling TSN flows in a communication system within a time-sensitive network.

The method is implemented at a central network configuration entity.

The method comprises:
  obtaining, from at least one TSN bridge having internal time constraints, assistance information relating to a time granularity of transmission opportunities, and
  based on the obtained assistance information, scheduling a plurality of TSN flows by computing time sequences of said TSN flows down to said time granularity.

The method is applicable to any bridge having internal time constraints, due for example to using a time-splitted transmission medium. Such bridge having internal time constraints, from which assistance information is obtained, is also referred to throughout this document as a "time-constraint TSN bridge". An example of such bridge is a 5G system acting as a TSN bridge, also referred to as a 5GS bridge. In this case, the transmission medium is a radio medium. Various exemplary embodiments are described hereinafter, accounting for diverse possible time splits of the transmission medium of the time-constraint TSN bridge. Of course, the method does not exclude obtaining additional assistance information from additional TSN bridges, which may also have internal time constraints or on the contrary be devoid thereof, for the shared purpose of scheduling the plurality of TSN flows. Indeed, the time-sensitive network may comprise various subnetworks and various TSN bridges, one, some, or all of which may have internal time constraints.

Figure 3:
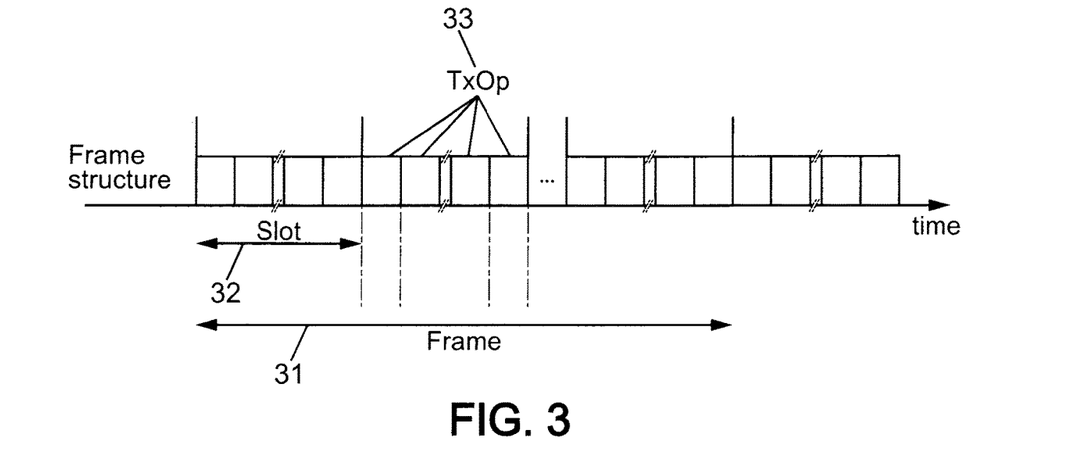
FIG. 3 illustrates, with respect to a transmission frame, a difference between scheduling TSN flows according to the prior art and according to an exemplary embodiment of the invention, where a time alignment at a slot level is performed.

One possible time split of the transmission medium is shown in FIG. 3. The frame (31) is the larger scale. Each frame can be divided in slots (32), and each slot is eventually split in transmission opportunities (TxOps) (33). In the case of a 5GS bridge, 5GS defines several numerologies for the slotting. In a typical example (frequency below 6 GHZ), the frame duration is about 10 ms long, the slot duration is 1 ms, which leads to a transmission opportunity duration around 140 μs. Considering a throughput of 50 Mbit/s, a transmission opportunity can transport about 800 octets of data.

The nature and the depth of the data from a time-constraint TSN bridge that may form relevant assistance information for the CNC may vary depending on the structure of the transmission frame at hand.

Moreover, the opportunities of improvement over the prior art, in terms of taking into account the assistance information at the CNC in view of optimizing the delay at said at least one TSN bridge, are also variable:
  based on the structure of the transmission frame at hand, as well as
  on the nature and the depth of the assistance information that is transmitted by the TSN bridge to the CNC.

Figure 3A:
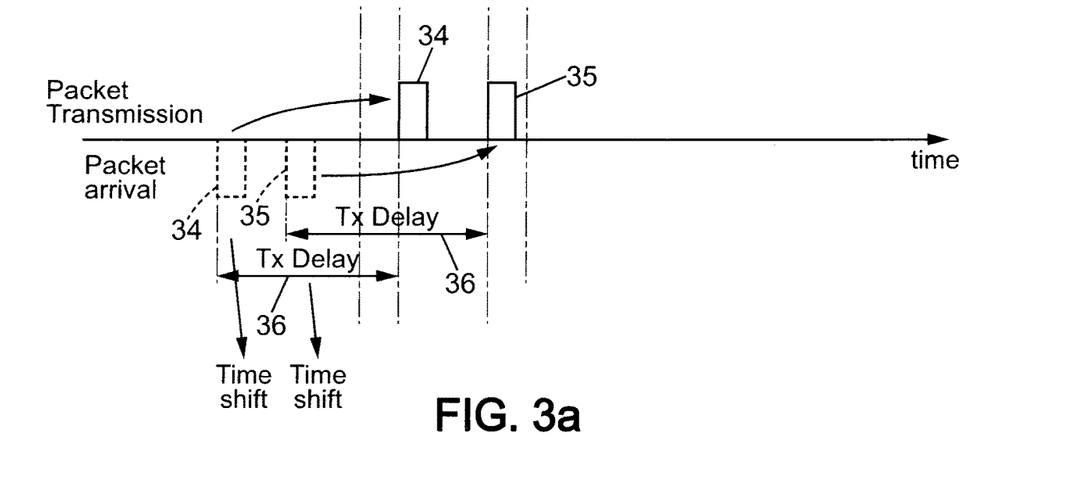
FIG. 3a illustrates, with respect to a transmission frame, a difference between scheduling TSN flows according to the prior art and according to an exemplary embodiment of the invention, where a time alignment at a slot level is performed.

In the case of the possible time split of the transmission medium shown in FIG. 3, a typical resource allocation, as known from the state of the art, at a base station is to define the scheduling for the next slot. It means that all packets (34, 35) arriving during slot n are transmitted at the sooner in slot n+1, as shown in FIG. 3a.

In the state of the art, the CNC computes its TSN scheduling considering an independent delay and a dependent delay for the TSN bridge provided by the TSN bridge.

The dependent delay is the part of the delay that is load-dependent. The dependent delay $D_{dep}$ can be computed for example in case the transmission medium is a radio medium, from the average throughput available in one slot assuming a given radio condition and a given load.

The independent delay is independent of the load, and, in the state of the art, includes the slot duration. Hence, this independent delay $D_{ind}$, advertised by the time-constraint TSN bridge, is typically defined by (Eq. 1)

$$D_{ind} = C + T_p + \text{margin} \quad \text{(Eq. 1)}$$

with C and the margin having both constant values and $T_p$ designating the full duration of a slot as represented in the example of FIG. 3.

In other words, as can be seen on FIG. 3a, in the state of the art, the actual transmission time of a packet (TxDelay) (36), defined as the time interval between the arrival time and the transmission time of the packet, is always strictly greater than the full duration of a slot.

Figure 3B:
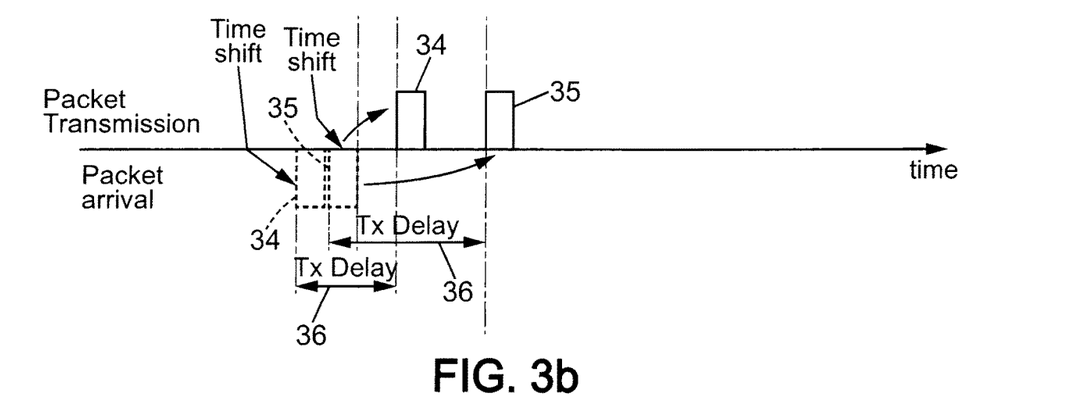
FIG. 3b illustrates, with respect to a transmission frame, a difference between scheduling TSN flows according to the prior art and according to an exemplary embodiment of the invention, where a time alignment at a slot level is performed.

There is a benefit to be able to shift packets arrival time within a given slot to be closer to the beginning of the next slot, in order to reduce the actual transmission time TxDelay (36), as illustrated in FIG. 3b.

In order to do so, in this example, the CNC needs to take more efficiently the TSN bridge slotting into account when computing the transmission time of the packets at each network device.

In this regard, for the CNC to be able to consider the independent delay of the time-constraint TSN bridge as being possibly smaller than a full slot duration, it is necessary for the CNC to have access not simply to the full slot duration $T_p$ as defined above, but to more specific information from the TSN bridge.

This more specific information is related at least to a time granularity of the transmission opportunities within the transmission frame.

In the case of an alignment at a slot level, depicted in FIG. 3b, a time-constraint TSN bridge thus provides to the CNC assistance information which may for example comprise the following indications:

per TSN bridge: a transmission period $T_p$ which, as already defined, corresponds to the duration of a slot, and also per TSN bridge: an offset $T_o$ corresponding to the beginning of a slot, relatively to a clock common to the TSN bridge and to the CNC.

According to this example, the assistance information $T_p$ and $T_o$ are values that are associated to the TSN bridge as a whole. In other words, $T_p$ and $T_o$ are values that are, in this example, common to all the port combinations of the TSN bridge which may be used as ingress and/or as egress ports.

With this assistance information, the independent delay advertised by the TSN bridge to the CNC may be reduced to become as (Eq. 2):

$$D_{ind} = C + \text{margin} \quad \quad \quad (\text{Eq. 2})$$

As a result, by knowing the offset $T_o$ marking the beginning of a slot and the time interval $T_p$ between the beginning of two consecutive slots, the CNC may compute time sequences of TSN flows that differentiate among the transmission opportunities within each slot. Therefore, contrary to the state-of the-art, such time sequences are computed down to a time granularity that is more precise than simply that of slots within the transmission frame. For example, the arrival time of a packet may be shifted towards the end of a given slot (therefore at a late transmission opportunity within the slot), while the subsequent transmission time of said packet may be scheduled at the beginning of the next slot (therefore at an early transmission opportunity within said slot).

Therefore, the resulting transmission delay may be smaller than the full duration of a slot.

In the above example with a time alignment at slot level, the assistance information does not need to comprise any indication regarding the inner composition of each slot, which may thus be hidden from the CNC.

However, providing to the CNC, as part of the assistance information, indications regarding the inner composition of each slot may allow for further improvements of the estimation of the independent delay at the CNC.

To illustrate this aspect, another example is described thereafter.

In this example, the TSN bridge is considered to be operating in Time Division Duplex (TDD) mode. This means that each slot may be described as a pattern of:

a set of transmission opportunities that are usable for an uplink transmission mode (UL TxOps), and another set of transmission opportunities that are usable for a downlink transmission mode (DL TxOps).

Figure 4:
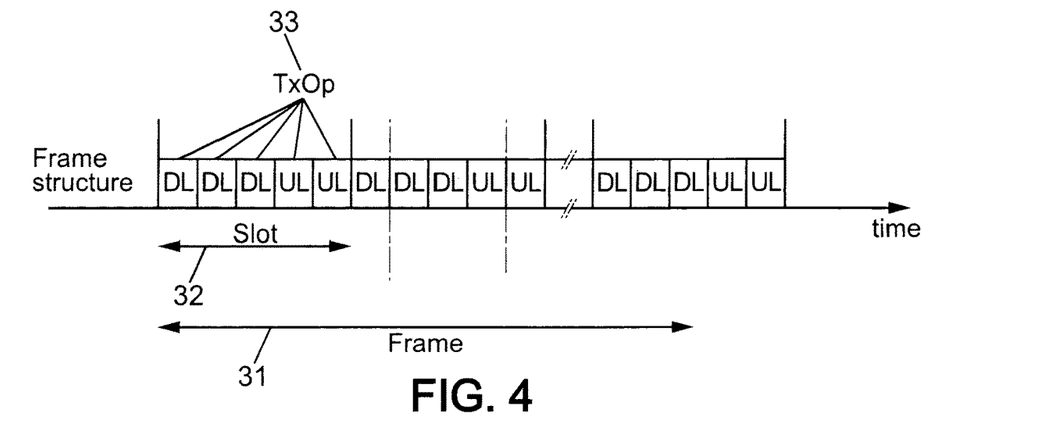
FIG. 4 illustrates, with respect to a transmission frame having a simple UL/DL TDD frame structure, a difference between scheduling TSN flows according to the prior art and according to an exemplary embodiment of the invention.

Such a framing may be as depicted in FIG. 4, assuming a static UL/DL partitioning. This means that the UL/DL pattern is constant over time, with the period $T_p$ corresponding to the slot duration, and that UL and DL TxOps are not or little interleaved.

In a known scenario, a scheduler at a base station is able to allocate resources to packets in the current slot. In another known scenario, some pre-allocation of resources is made, assuming a periodic TSC traffic.

Figure 4A:
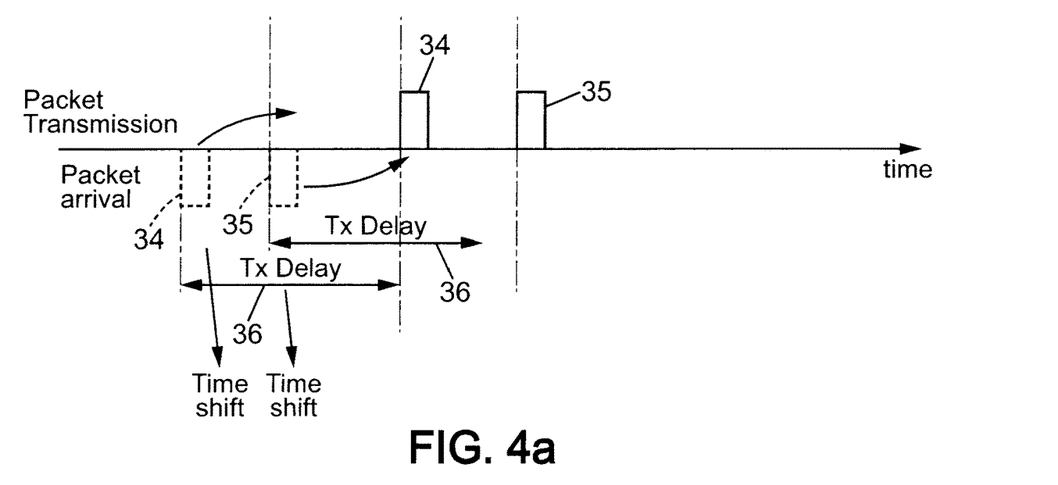
FIG. 4a illustrates, with respect to a transmission frame having a simple UL/DL TDD frame structure, a difference between scheduling TSN flows according to the prior art and according to an exemplary embodiment of the invention.

In the state of the art, as depicted in FIG. 4a, the transmission delay (36) is strictly greater than the full duration of a slot, with the additional constraints that, for a given packet, the transmission of said packet can only occur during transmission opportunities that are usable for the transmission mode (uplink or downlink) of said packet.

In order to align as most as possible the arrival time of the packets with the transmission frame slotting, a possibility is to inform the CNC, through the assistance information from the TSN bridge, that the TxOps are of two different natures, depending on the direction of the data flow.

Figure 5:
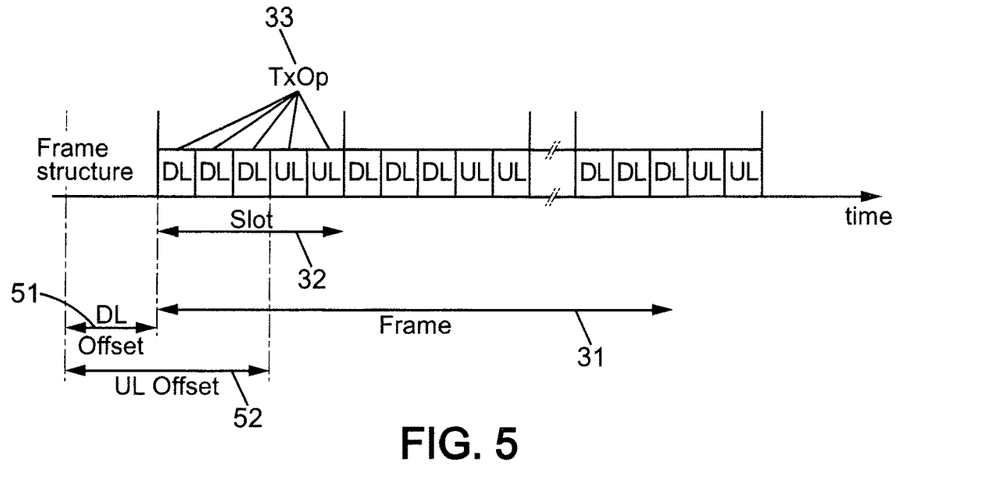
FIG. 5 illustrates the nature of the assistance information transmitted by a TSN bridge in the case of a transmission frame having a simple UL/DL TDD frame structure according to an exemplary embodiment of the invention.

In such example, the assistance information provided by the TSN bridge to the CNC may thus comprise a transmission period $T_p$, corresponding to the full duration of a slot, and two offsets $T_o^1$ and $T_o^2$ for respectively marking the beginning of a UL TxOp and the beginning of a DL TxOp. Both offsets are relative to a clock common to the TSN bridge and the CNC. Such type of assistance information is illustrated in FIG. 5.

Such assistance information is however not ideal. Indeed, the CNC does not need to be aware of transmission medium details and of details of the internal configuration of the TSN bridge. In particular identifying a usage of a transmission opportunity as an uplink or a downlink usage is, in principle, a notion that the CNC shall not be aware of.

Therefore, to warn the CNC that time constraints can be different depending of data flow direction, it is proposed to indicate a time offset per oriented port pair at the TSN bridge. Hence, an offset $T_o^{ij}$ is provided for the oriented port pair $(P_i, P_j)$—assuming $P_i$ as ingress port and $P_j$ as egress port, and an offset $T_o^{ji}$ for the oriented port pair $(P_j, P_i)$—assuming $P_j$ as ingress port and $P_i$ as egress port. Hence, the TSN bridge is able to provide a different offset value for DL and for UL.

Assistance information provided by the TSN bridge to the CNC may comprise, in this case, the following indications:

per TSN bridge: a transmission period $T_p$, corresponding to the full duration of a slot, and per oriented port pair $(P_i, P_j)$ of such bridge: an offset $T_o^{ij}$ (51) relative to a clock common to the TSN bridge and to the CNC, with $P_i$ the ingress port and $P_j$ the egress port of the port pair $(P_i, P_j)$ Based on the values of $T_p$ and $T_o^{ij}$, the independent delay $D_{ind}$ advertised by the TSN bridge to the CNC may be computed as defined in (Eq. 2), while the dependent delay $D_{dep}$ may be computed for one direction (UL or DL) from the average throughput available in one slot for one direction, assuming a given radio condition and a given load from (Eq. 3) in case the transmission medium is a radio medium.

$$1 / D_{dep} = B_{dep,d}^{moy} = \frac{n_s^d \cdot Caps^d}{T_p} \quad \quad (\text{Eq. 3})$$

with d indicating the direction: UL or DL $n_s^d$ being the number of TxOps for the direction d in said slot $Caps^d$ being the capacity in bits of one TxOp, assuming a given radio condition and a given load, and $T_p$ being the full duration of one slot.

To be noted that in state of the art, the delays are provided by a TSN bridge to the CNC per oriented port pair.

Figure 4B:
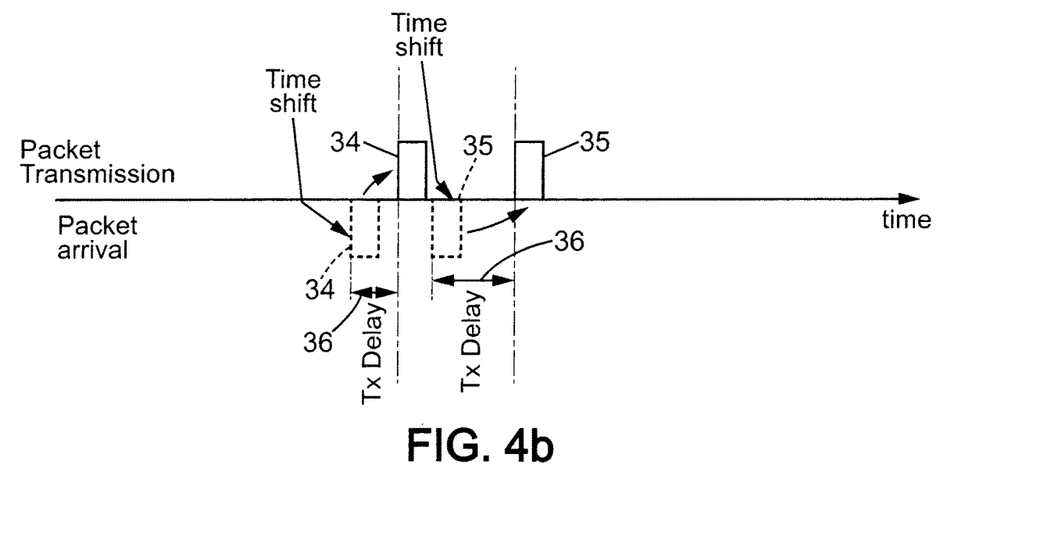
FIG. 4b illustrates, with respect to a transmission frame having a simple UL/DL TDD frame structure, a difference between scheduling TSN flows according to the prior art and according to an exemplary embodiment of the invention.

This allows the CNC to minimize the transmission delay (36) at the TSN bridge, by scheduling, for example, an arrival of a packet (34) during a UL TxOp within a given slot and a transmission of such packet during the next UL TxOp of the next slot, as shown in FIG. 4b. Conversely, considering an opposite flow, an arrival of another packet (35) may be scheduled during a DL TxOp within a given slot and a transmission of such packet may be scheduled during the next DL TxOp of the next slot.

In yet another example, it may be taken advantage of the flexibility of the 5G standard in terms of dedicating TxOps in a slot to UL and DL.

Figure 6:
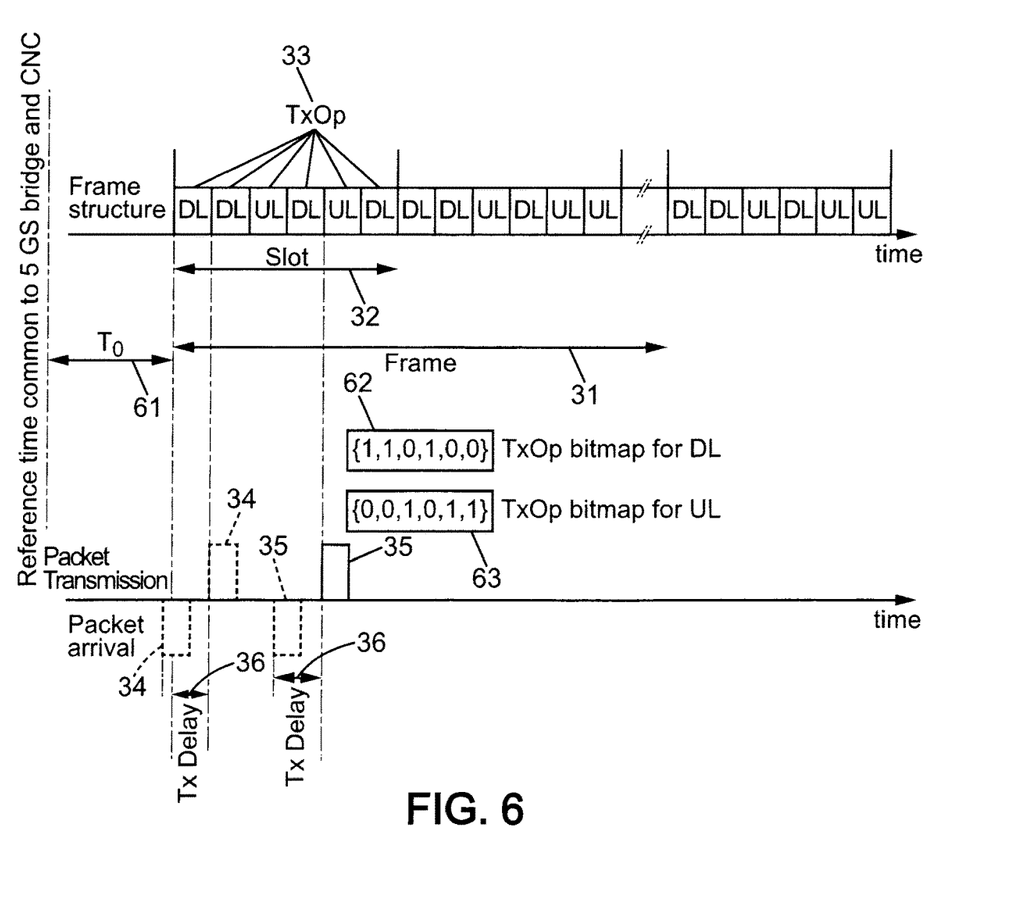
FIG. 6 illustrates the nature of the assistance information transmitted by a TSN bridge in the case of a transmission frame having a flexible UL/DL TDD frame structure according to an exemplary embodiment of the invention.

One such example is depicted in FIG. 6.

In such example, in order to align as most as possible packets arrival time with the transmission frame slotting, the CNC should be aware of the details of TxOps inside a slot.

A possibility is to provide to the CNC, for each oriented port pair ($P_i$, $P_j$) of a time-constraint TSN bridge, a bit map corresponding to the TxOps that can be used for this oriented port pair. Hence the bit map {1, 1, 0, 1, 0, 0} may indicate that the slot comprises 6 TxOps, but only the first, second and fourth could be used for data flows going from port $P_i$ to port $P_j$.

Assistance information provided to the CNC may comprise, in this example, the following indications:
- per TSN bridge: a transmission period $T_p$, corresponding to slot duration and an offset $T_o$ (51) corresponding to the beginning to a slot, relatively to a clock common to the TSN bridge and the CNC, and
- per oriented port pair ($P_i$, $P_j$) of such TSN bridge, a bit map (62) of available TxOps inside a slot.

Typically, a time-constraint TSN bridge will define in this scenario one TxOp bit map for DL (62) and one TxOps bitmap for UL (63), and will provide in assistance information one or the other for each oriented port pair.

Alternately, it is possible to provide to the CNC a plurality of possible slot configurations for a given TSN bridge combined with, for each oriented port pair ($P_i$, $P_j$), a corresponding index pointing towards one of these possible slot configurations.

As a result of such alternative, the assistance information provided to the CNC may comprise the following indications:
- per TSN bridge, a transmission period $T_p$, corresponding to slot duration, an offset $T_o$ corresponding to the beginning to a slot, relatively to a clock common to said TSN bridge and the CNC, and different bit maps corresponding to different available TxOps configurations, as well as
- per oriented port pair ($P_i$, $P_j$): an index to the TxOps bitmap to use.

Based on the values of $T_p$ and $T_o$, the independent delay ($D_{ind}$) advertised by the TSN bridge to the CNC may be computed such as defined in (Eq. 2).

Based on the assistance information as a whole, the dependent delay ($D_{dep}$) may preferably be computed as an 'instantaneous' delay, i.e. computed from the throughput of a single TxOp, assuming a given radio condition and a given load (Eq. 4) in case the transmission medium is a radio medium.

$$1/D_{dep} = B_{dep,d}^{inst} = \frac{Caps^d}{t_{TxOp}} = \frac{n_s^{tot} \cdot Caps^d}{T_p} \quad \text{(Eq. 4)}$$

with
d the direction, UL or DL
$n_s^{tot}$ the total number of TxOps in one slot
$Caps^d$ the capacity in bits of one TxOp (assuming a given radio condition and a given load)
$T_p$ the duration of one slot, and
$t_{TxOp}$ the duration of a TxOp.

Figure 7:
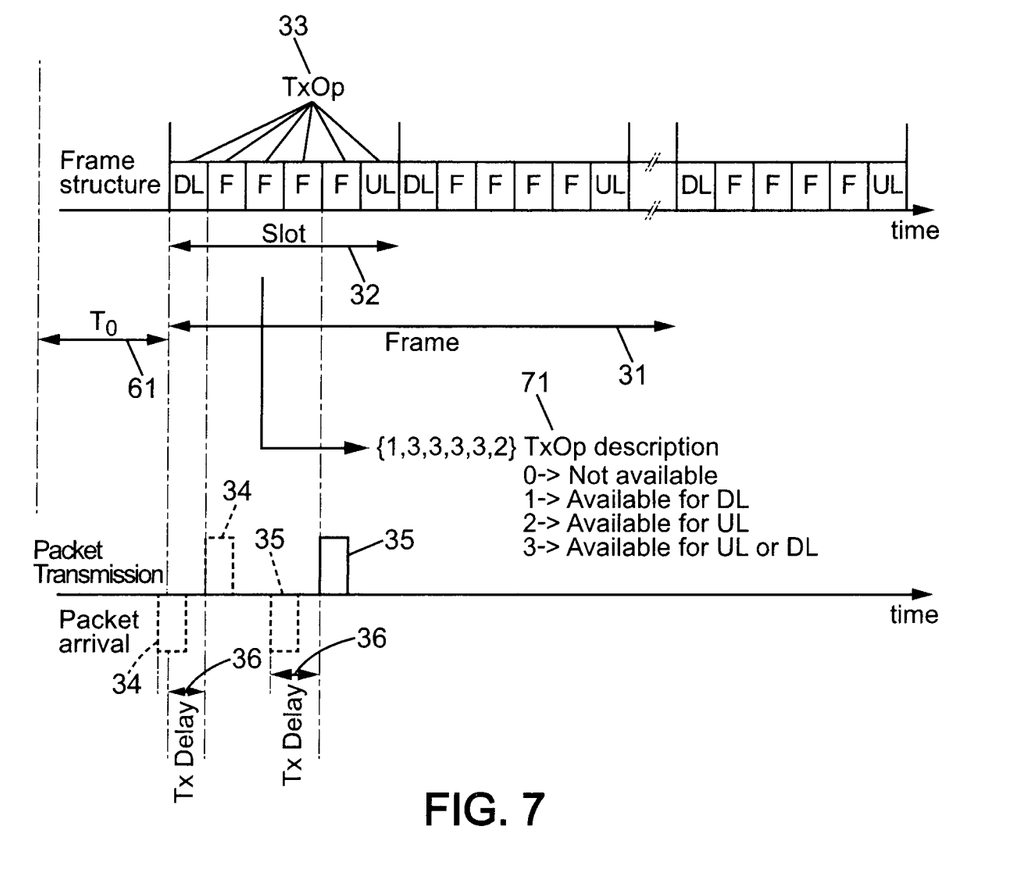
FIG. 7 illustrates the nature of the assistance information transmitted by a TSN bridge in the case of a transmission frame having a UL/DL/F TDD frame structure, "F" referring to transmission opportunities of a flexible nature, according to an exemplary embodiment of the invention.

Yet another example illustrating the high flexibility of the 5G standard is depicted in FIG. 7. As a further variation of UL/DL patterns as shown in FIGS. 4 to 6, FIG. 7 further introduces the notion of flexible TxOps (F). A flexible TxOp is allocated either to UL or DL transmission by a base station at the last moment, i.e. the slot structure can be indicated in the control part at the beginning of each slot.

In this embodiment, the frame structure is still considered as periodic, i.e. the slot structure is constant among time, but the TSN bridge indicates which slots can be flexible. The TSN bridge further indicates the direction (UL or DL) of each oriented port pair. With those pieces of information, CNC can determine the best UL/DL structure for a given stream set.

Hence, in this example, the assistance information provided by the TSN to the CNC may comprise the following indications:
- per TSN bridge, a transmission period $T_p$, corresponding to the duration of a slot, and an offset $T_o$ (61) marking the beginning of said slot, relatively to a clock common to 5GS bridge and the CNC,
- per TSN bridge, a set of values (71) indicating a structure of the TxOps within said slot, with each value being for example coded as:
  - 0: TxOp not available
  - 1: TxOp available for direction d1 (e.g. DL TxOp)
  - 2: TxOp available for direction d2 (e.g. UL TxOp)
  - 3: TxOp available for both directions (flexible TxOp), and
- per oriented port pair ($P_i$, $P_j$), a value (84) indicating the direction d1 or d2 of the oriented port pair.

Figure 8:
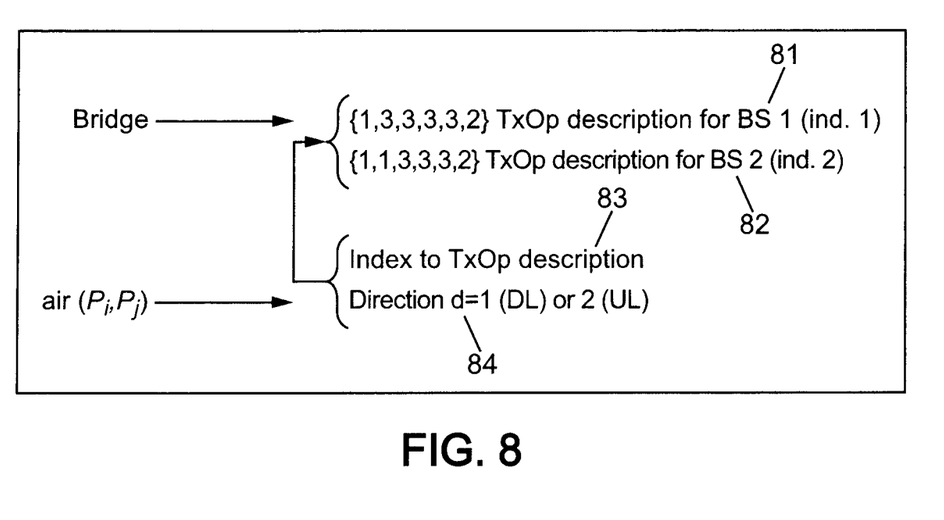
FIG. 8 illustrates, as an exemplary nature of assistance information, a description of transmission opportunities along with information related to oriented port pairs, according to an exemplary embodiment of the invention.

These assistance information are further illustrated in FIG. 8.

The set of values indicating a structure of the TxOps within a slot is a type of descriptive assistance information which is similar to the bitmap in the example of FIG. 6, with the addition that the present example allows a greater number of possible values, in order to allow signalling, in particular, specific TxOps as being flexible.

Of course, instead of providing a single set of values describing a structure of the TxOps within a given slot, it is also possible, as an alternative, for a TSN bridge to provide to the CNC a plurality (81, 82) of possible such sets of values. In addition, to allow the CNC to select one specific, relevant, set of values for any given oriented port pair of such TSN bridge, it is also possible for the TSN bridge to provide to the CNC an index (83), per oriented port pair, pointing to a corresponding one of these possible such sets of values.

Similarly to the example of FIG. 6, the independent delay $D_{ind}$ advertised by the TSN bridge to the CNC may be computed as defined in (Eq. 2), while the dependent delay $D_{dep}$ would preferably be computed as an 'instantaneous' delay, i.e. computed from the throughput of one TxOp, assuming a given radio condition and a given load (Eq. 4) in case the transmission medium is a radio medium.

In addition, optionally, the CNC may indicate the slot structure that it has chosen back to the TSN bridge having issued such assistance information. This indication may for instance be under the form of one or several sets of values describing at least the flexible TxOps. The encoding may be similar to that of the set of values indicating the structure of the TxOps which has previously been provided by the TSN bridge as part of the assistance information.

A further possibility that may be encountered in any of the previous examples is that a TSN bridge may be internally built with several base stations. Hence, potentially, there may be one different TDD frame configuration per base station.

However, it may be required on the contrary, for example by radio spectrum regulation rules in case the transmission medium is a radio medium, or in order to limit inter-base station interferences, that all base stations in a given TSN bridge have the same TDD frame configuration.

Such specific requirement may also be indicated by the TSN bridge to the CNC. To do so, for example, a unique TxOp description may be indicated, by convention, as part of the assistance information.

The invention claimed is:

1. A method for scheduling TSN flows in a communication system within a time-sensitive network, TSN, the method being implemented at a central network configuration entity and comprising:
    obtaining, from at least one TSN bridge having internal time constraints, assistance information relating to a time granularity of transmission opportunities within a transmission frame divided in slots, the slots being split in said transmission opportunities, and
    based on the obtained assistance information, scheduling a plurality of TSN flows by computing time sequences of said TSN flows down to said time granularity by considering a transmission delay, through said TSN bridge, that is smaller than the full duration of a slot.

2. The method according to claim 1, wherein the assistance information from a TSN bridge comprises a period and an offset, said offset being defined with respect to a clock common to the central network configuration entity and to said TSN bridge.

3. The method according to claim 2, wherein the period corresponds to a slot duration and the offset indicates the beginning of a slot.

4. The method according to claim 3, wherein the assistance information from a TSN bridge further comprises an indication of an allocation of each transmission opportunity, within a slot, between a first and a second directions of transmission.

5. The method according to claim 4, wherein said indication comprises, for a plurality of oriented port pairs, a corresponding bitmap of an availability status of each transmission opportunity within a slot.

6. The method according to claim 4, wherein said indication comprises:
    a plurality of bitmaps of an availability status of each transmission opportunity, within a slot, for a given direction of transmission, a bitmap corresponding to a predetermined possible slot structure, and
    for a plurality of oriented port pairs, a corresponding index to a specific bitmap of said plurality of bitmaps.

7. The method according to claim 3, wherein the assistance information from a TSN bridge further comprises:
    an indication of a corresponding nature of each transmission opportunity, each said nature being either flexible or fixed,
        a flexible nature being associated to a flexible usage for a first and of a second directions of transmission,
        a fixed nature being associated to a fixed usage for only one direction of transmission among the first and the second directions of transmission, and
    for a plurality of oriented port pairs, an indication of a corresponding direction of transmission among the first and second directions of transmission.

8. The method according to claim 3, wherein the assistance information from a TSN bridge further comprises:
    a plurality of sets of values, a set of value corresponding to a predetermined possible slot structure and indicating an availability status of each transmission opportunity, within a slot, for each of a first and a second direction of transmission, and
    for a plurality of oriented port pairs, a corresponding index to a specific set of values of said plurality of sets of values, and an indication of a corresponding direction of transmission among the first and second directions of transmission.

9. The method according to claim 1, wherein the assistance information from a TSN bridge comprises a period and further comprises, for a plurality of oriented port pairs, a corresponding offset, said offsets being defined with respect to a clock common to the central network configuration entity and to said TSN bridge.

10. The method according to claim 9, wherein the period corresponds to a slot duration, a first offset indicates the beginning of a first group of transmission opportunities statically allocated to a first direction of transmission and a second offset indicates the beginning of a second group of transmission opportunities statically allocated to a second direction of transmission.

11. A central network configuration entity for a communication system within a time-sensitive network, TSN, the central network configuration entity comprising:
    processing circuitry configured to:
        obtain, from at least one TSN bridge having internal time constraints, assistance information relating to a time granularity of transmission opportunities within a transmission frame divided in slots, the slots being split in said transmission opportunities, and
        based on the obtained assistance information, schedule a plurality of TSN flows by computing time sequences of said TSN flows down to said time granularity by considering a transmission delay, through said TSN bridge, that is smaller than the full duration of a slot.

12. A communication system within a time-sensitive network, the communication system comprising at least one TSN bridge having internal time constraints and a central network configuration entity according to claim 11.

* * * * *